(12) United States Patent
Sultenfuss et al.

(10) Patent No.: US 8,242,727 B2
(45) Date of Patent: Aug. 14, 2012

(54) SYSTEM AND METHOD FOR A HIGH EFFICIENCY REMOTE THREE PHASE FAN COMMUTATION INTEGRATION CONTROL IN AN INFORMATION HANDLING SYSTEM

(75) Inventors: Andrew T. Sultenfuss, Leander, TX (US); Mark L. Rehman, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 489 days.

(21) Appl. No.: 12/505,222

(22) Filed: Jul. 17, 2009

(65) Prior Publication Data

US 2011/0012547 A1  Jan. 20, 2011

(51) Int. Cl.
*H02P 6/18* (2006.01)

(52) U.S. Cl. ............... 318/400.34; 318/599; 318/459; 388/928.1; 388/811

(58) Field of Classification Search ............ 318/599, 318/811, 459, 500, 400.34, 400.32, 400.37; 388/804, 811, 819, 928.1
See application file for complete search history.

(56) References Cited

U.S. PATENT DOCUMENTS

| | | | |
|---|---|---|---|
| 5,410,230 A * | 4/1995 | Bessler et al. | 318/471 |
| 5,592,058 A * | 1/1997 | Archer et al. | 318/400.09 |
| 5,727,928 A * | 3/1998 | Brown | 417/44.11 |
| 5,788,566 A | 8/1998 | McAnally et al. | |
| 5,905,347 A | 5/1999 | Kocis | |
| 6,188,572 B1 | 2/2001 | Liao et al. | |
| 6,236,175 B1 * | 5/2001 | Mourad et al. | 318/268 |
| 6,643,128 B2 * | 11/2003 | Chu et al. | 361/679.48 |
| 6,650,074 B1 | 11/2003 | Vyssotski et al. | |
| 7,075,261 B2 * | 7/2006 | Burstein | 318/400.11 |
| 7,305,316 B2 * | 12/2007 | Frankel et al. | 702/99 |

* cited by examiner

*Primary Examiner* — Rina Duda
(74) *Attorney, Agent, or Firm* — Larson Newman, LLP

(57) ABSTRACT

An information handling system includes a three phase brushless direct current motor and a motherboard which in turn includes a drive circuit. The three phase brushless direct current motor is configured to rotate a cooling fan in the information handling system based on a control signal. The drive circuit is connected to the three phase brushless direct current motor, and the drive circuit is configured to adjust the control signal sent to the three phase brushless direct current motor based on a back electromagnetic flux signal.

20 Claims, 4 Drawing Sheets

SYSTEM AND METHOD FOR A HIGH EFFICIENCY REMOTE THREE PHASE FAN COMMUTATION INTEGRATION CONTROL IN AN INFORMATION HANDLING SYSTEM

FIELD OF THE DISCLOSURE

This disclosure relates generally to information handling systems, and more particularly relates to a system and method for a high efficiency remote three phase fan commutation integration control in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Brushless direct current (BLDC) fan motors house a significant number of components within the central hub of the fan motor housing. Different types of BLDC fan motors include two pole direct current (DC) fans and six pole DC fans. The two pole DC fans generally use so-called single phase DC motors that operate with power applied through a zero angle. The six pole DC fans generally use three phase DC motors, which are more efficient than the single phase motors.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
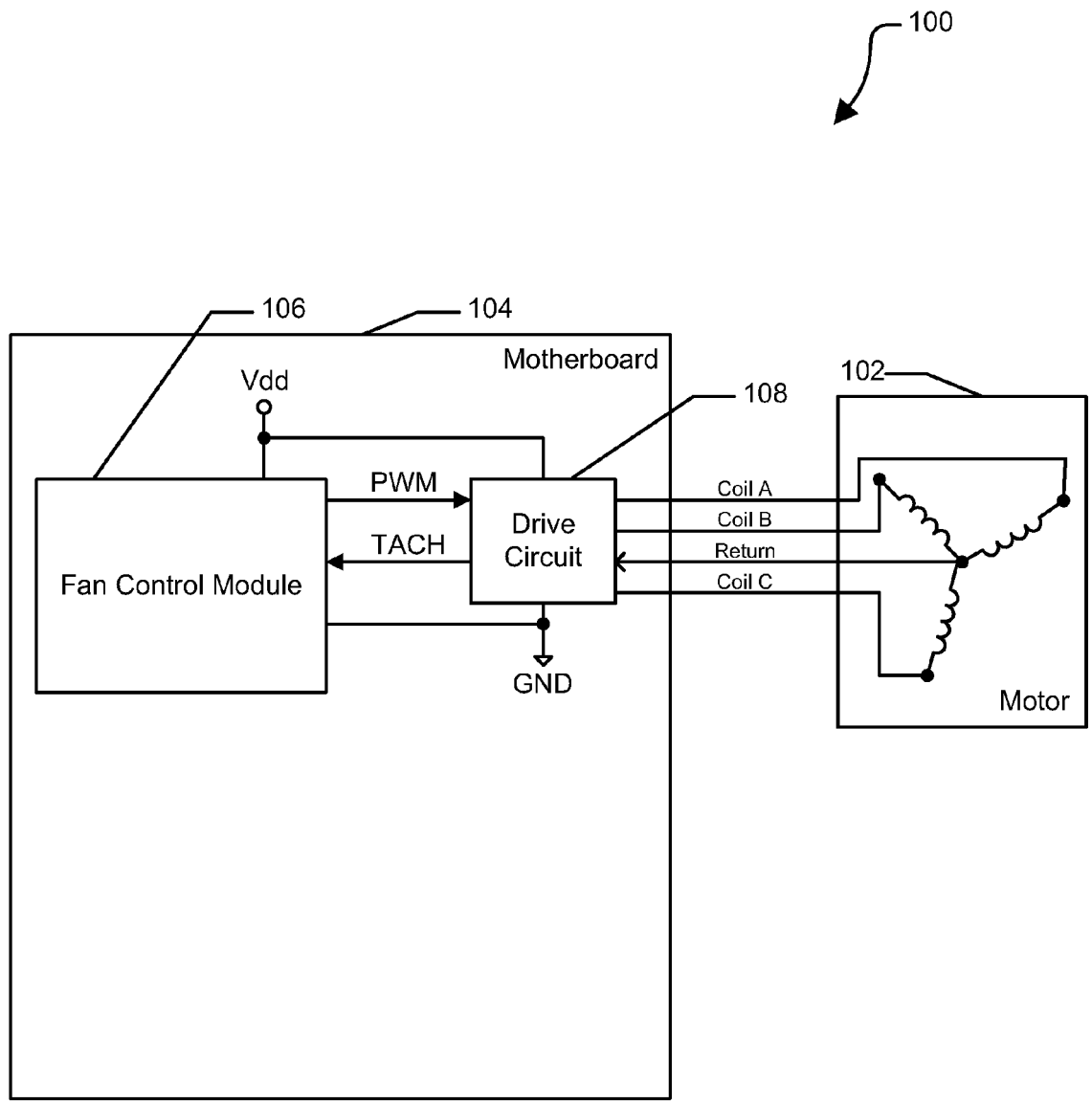
FIG. 1 is a partial block diagram and a partial schematic diagram of a three phase brushless direct current fan motor system for use in an information handling system.

FIG. 1 shows a brushless direct current (BLDC) fan motor system 100 of an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

The BLDC fan motor system 100 includes a three phase BLDC fan motor 102 and a motherboard 104 that in turn includes a fan control module 106 and a drive circuit 108. The fan control module 106 includes a first terminal connected to a first voltage reference, labeled $V_{dd}$, second and third terminals, and a fourth terminal connected to a second voltage reference, labeled GND. The drive circuit 108 includes a first terminal connected to the first voltage reference, second, third, fourth, and fifth terminals, a sixth terminal connected to the second voltage reference, a seventh terminal connected to the third terminal of the fan control module 106, and an eighth terminal connected to the second terminal of the fan control module. The three phase BLDC fan motor 102 includes a first terminal connected to the second terminal of the drive circuit 108, a second terminal connected to the third terminal of the drive circuit, a third terminal connected to the fourth terminal of the drive circuit, and a fourth terminal connected to the fifth terminal of the drive circuit. The three phase BLDC fan motor 102 also includes an inner portion having three coils, and an outer portion having six poles or permanent magnets (not shown).

The fan control module 106 provides a pulse width modulated (PWM) or linear drive signal based on a received tachometer signal. The drive circuit 108 receives back electromagnetic flux (EMF) signals, as discussed below, and the PWM or linear drive signal, and transmits three PWM signals based on the PWM or linear drive signal and the back EMF signal.

During operation, the fan control module 106 and the drive circuit 108 are both provided with the same supply voltage from the first voltage reference. However, in a conventional BLDC fan motor system, the supply voltage for the drive circuit 108 is incorporated within the PWM signal from the fan control module. Thus, the supply voltage provided to the fan control module 106 and the drive circuit 108 can vary without causing any effect on the PWM or linear drive signal. The PWM or linear drive signal is sent from the fan control module 106 to the drive circuit 108, and the PWM or linear drive signal can be adjusted based on the tachometer signal received from the drive circuit. The tachometer signal may be a square wave, and the frequency of the tachometer signal can be varied based on the status of the three phase BLDC fan motor 102 as determined by the drive circuit 108.

The six poles within the outer portion of the three phase BLDC fan motor 102 alternate between north and south polarities. Each of the three PWM signals sent to the three phase BLDC fan motor individually charges a coil, and each of the three PWM signals are sent from the drive circuit 108 along a different wire, labeled coil A, coil B, and coil C. Additionally, the three PWM signals are each 120 degrees out of phase from each other, such that there are always two coils charged at the same time.

As each coil is charged, the outer portion of the three phase BLDC fan motor 102 rotates so that a pole with the corresponding polarity aligns with the charged coil. The charging of a coil 'pulls' the outer portion of the three phase BLDC fan motor 102, such that a pole aligns with the charged coil. The 'pulling' of the outer portion causes the fan blades (not shown) connected to the outer portion to rotate. Therefore, the three PWM signals from the drive circuit 108 provide additional torque to the three phase BLDC fan motor 102 and the fan blades because two coils are being charged and thus 'pulling' the outer portion at the same time.

The back EMF signal can be generated within the three phase BLDC fan motor 102 based on an electromagnetic flux created as a pole passes the uncharged coil. As the pole or permanent magnet passes the uncharged coil, the magnetic field of the pole induces a magnetic flux in the uncharged coil that in turn induces a current through the uncharged coil. The back EMF signal is provided from the three phase BLDC fan motor 102 to the drive circuit 108 via the return line. The back EMF signal can indicate which of the three coils is uncharged and passed by a pole, based on the wire associated with the back EMF signal.

For example, if coil A is uncharged and a pole passes coil A, a magnetic flux and a current are induced in coil A. Upon receiving the back EMF signal, the drive circuit 108 can determine that the back EMF was induced in coil A based on the current being associated with the coil A wire and the return line. Thus, if the three phase BLDC fan motor 102 is rotating properly, the drive circuit 108 can associate the back EMF signal with a current induced in coil A, then coil B, then coil C, then coil A, then coil B, then coil C, and so on.

The back EMF signal can include pulses, such that each pulse is associated with a current being induced in a different uncharged coil. The drive circuit 108 can determine the amount of time between each of the pulses in the back EMF signal to determine whether the three phase BLDC fan motor 102 is rotating at a desired speed. The drive circuit 108 can adjust the three PWM signals sent to the three phase BLDC fan motor 102 based on the back EMF signal, such as whether a pole is aligning with a different uncharged coil in the correct order and at the right time. Therefore, if a pole is not aligning with an uncharged coil at the correct time but instead is either lagging behind or jumping ahead of the uncharged coil based on the PWM signals, the drive circuit 108 can adjust the PWM signals to either increase or decrease the rotational speed of the outer portion of the three phase BLDC fan motor 102. Thus, the drive circuit 108 does not need a sensor to detect a pole as it passes, such as a Hall effect sensor, to ensure that the three phase BLDC fan motor 102 is operating properly as is required in conventional BLDC fan motors.

The fan control module 106 of the three phase BLDC fan motor system 100 is compatible with older generation BLDC fan motors. Thus, if the motherboard 104 does not include the drive circuit 108, the fan control module 106 can receive a tachometer signal from an older generation BLDC fan motor. The fan control module 106 can use the tachometer signal from the older generation BLDC fan motor and vary the PWM or linear drive signal provided to the three phase BLDC fan motor based on the tachometer signal.

Figure 2:
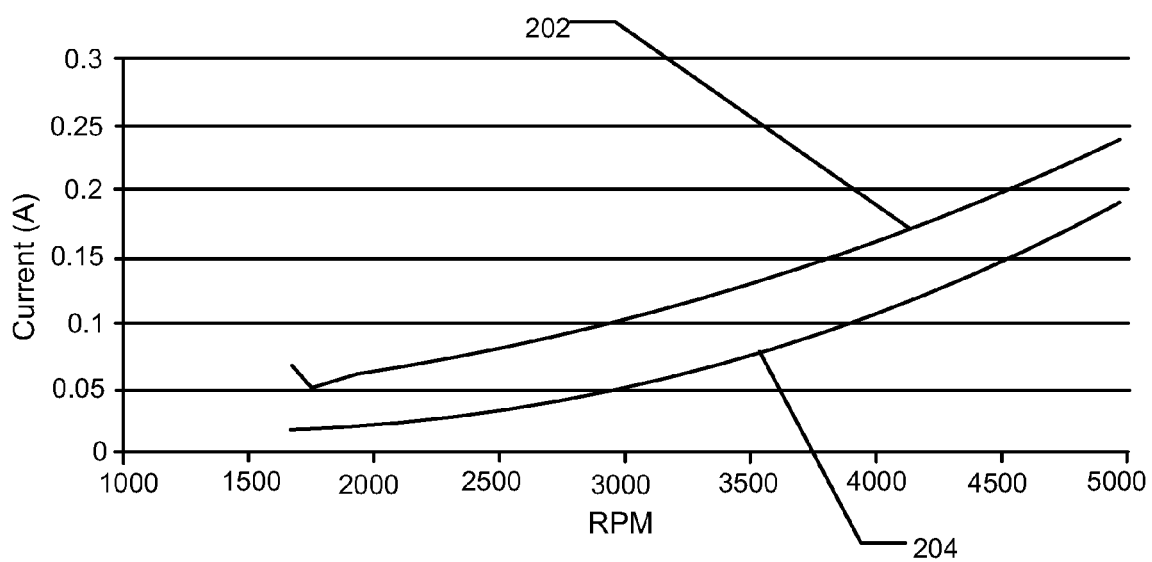
FIG. 2 is a graph of a current usage versus rotations per minute for two different types of three phase brushless direct current fan motors.

FIG. 2 show a graph of current usage in a conventional three phase BLDC fan motor and in the three phase BLDC fan motor 102 of FIG. 1. A first current usage plot 202 represents the current usage in the conventional three phase BLDC fan motor, and a second current usage plot 204 represents the current usage in the three phase BLDC fan motor 102. As can be seen by a difference between the second current usage plot 204 and the first current usage plot 202, the three phase BLDC fan motor 102 uses less current at every rotation per minute of the fan motor than a conventional three phase BLDC fan motor. Thus, the BLDC fan motor system 100 is more power efficient overall than a conventional three phase BLDC fan motor system.

Figure 3:
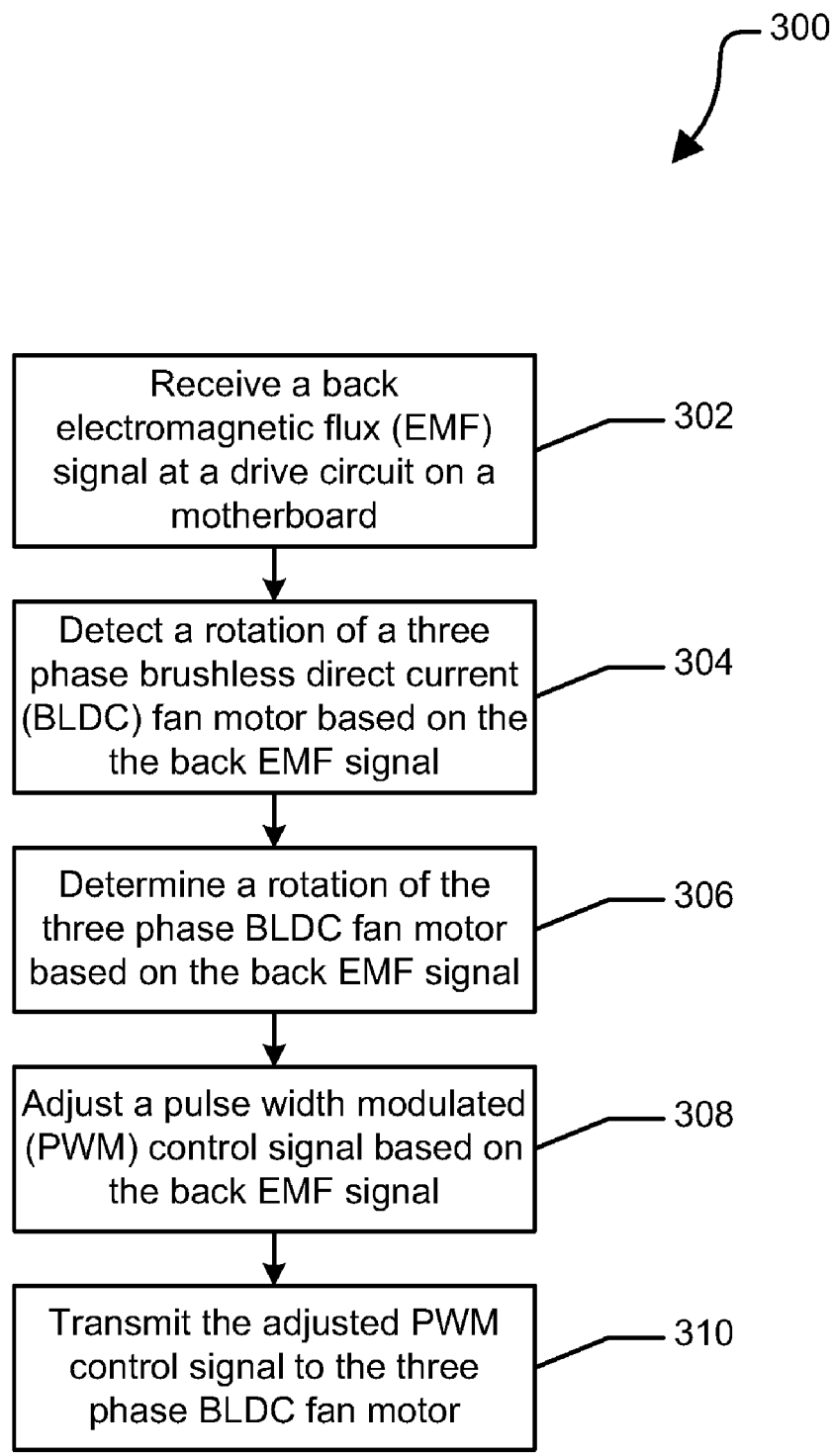
FIG. 3 is a flow diagram of a method for controlling a three phase brushless direct current fan motor.

FIG. 3 shows a flow diagram of a method 300 for controlling the three phase BLDC fan motor 102 of FIG. 1. At block 302, a back EMF signal is received at a drive circuit from a three phase BLDC fan motor. A rotation of the three phase BLDC fan motor is detected based on the back EMF signal at block 304. At block 306, a timing of the three phase BLDC fan motor is determined based on the back EMF signal. A control signal is adjusted based on the back EMF signal at block 308. At block 310, the adjusted control signal is transmitted to the three phase BLDC fan motor.

Figure 4:
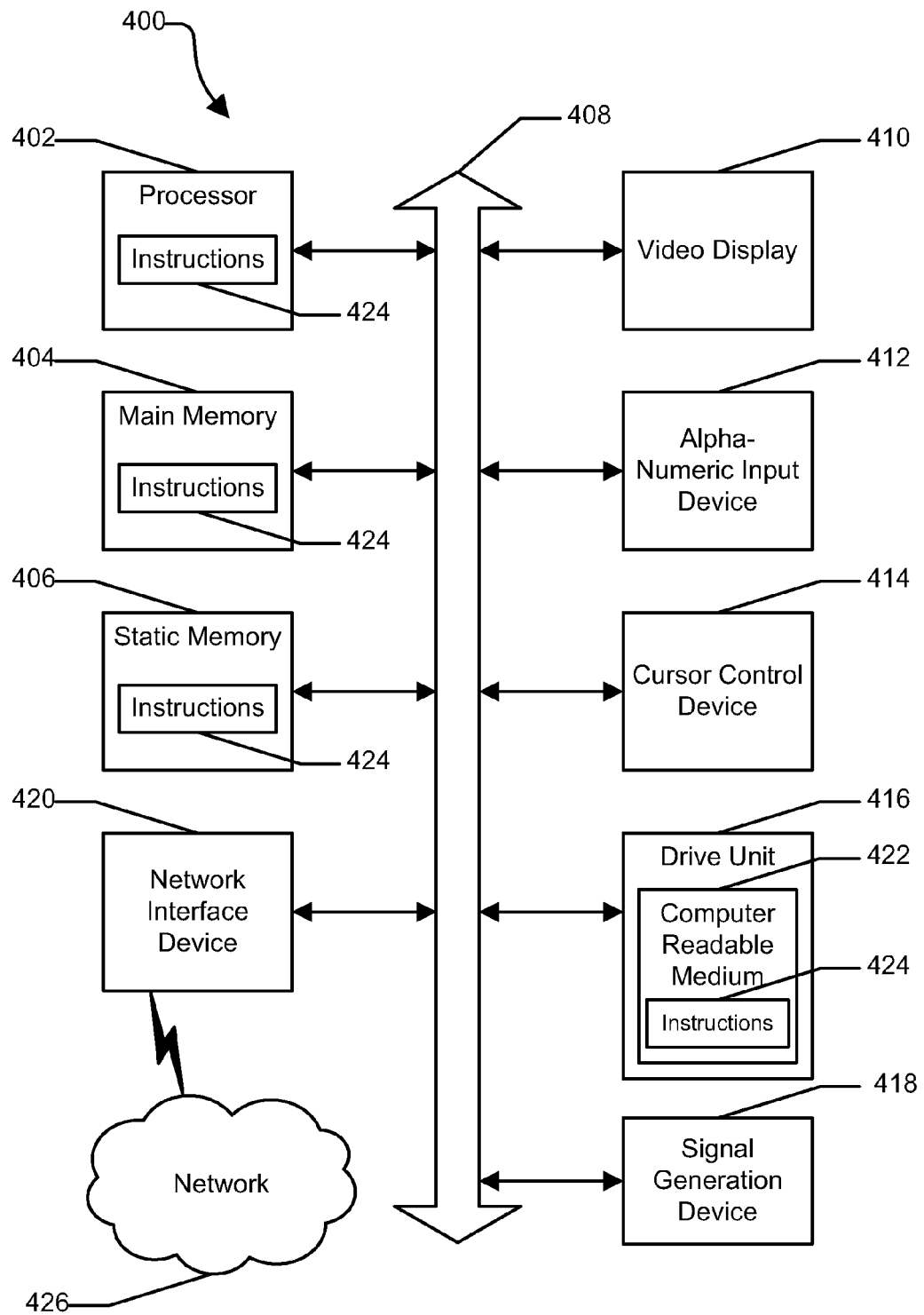
FIG. 4 is a block diagram of a general computer system.

FIG. 4 shows an illustrative embodiment of a general computer system 400 in accordance with at least one embodiment of the present disclosure. The computer system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402 such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424 such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media. The network interface device 420 can provide connectivity to a network 426, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a three phase brushless direct current motor configured to rotate a cooling fan in the information handling system based on a control signal; and
   a motherboard including:
      a drive circuit connected to the three phase brushless direct current motor, the drive circuit configured to adjust the control signal sent to the three phase brushless direct current motor based on a back electromagnetic flux signal indicating that a pole of the three phase brushless direct current motor is either lagging behind or jumping ahead of an uncharged coil of the three phase brushless direct current motor.

2. The information handling system of claim 1 wherein the motherboard further comprises:
   a fan control module in communication with the drive circuit, the fan control module configured to adjust a pulse width modulated signal transmitted to the drive circuit based on a tachometer signal received from the drive circuit.

3. The information handling system of claim 2 wherein a supply voltage to the drive circuit is separate from the pulse width modulated signal provided by the fan control module.

4. The information handling system of claim 2 wherein a combination of the drive circuit and the fan control module is three phase commutation circuitry.

5. The information handling system of claim 1 wherein the adjustment of the control signal in the drive circuit based on the back electromagnetic flux signal provides a low current usage of the three phase brushless direct current motor.

6. The information handling system of claim 1 wherein the back electromagnetic flux signal indicates a performance of the three phase brushless direct current motor.

7. The information handling system of claim 1 wherein the back electromagnetic flux signal is provided via a virtual ground of the three phase brushless direct current motor.

8. A system comprising:
   a motherboard including:
      a drive circuit configured to communicate with a three phase brushless direct current motor, the drive circuit configured to adjust control signals sent to the three phase brushless direct current motor based on a back electromagnetic flux signal indicating that a pole of the three phase brushless direct current motor is either lagging behind or jumping ahead of an uncharged coil of the three phase brushless direct current motor; and a fan control module in communication with the drive circuit, the fan control module configured to adjust a pulse width modulated signal transmitted to the drive circuit based on a tachometer signal received from the drive circuit.

9. The system of claim 8 wherein the drive circuit is further configured to control a conventional pulse width modulation motor.

10. The system of claim 8 wherein a supply voltage to the drive circuit is separate from the pulse width modulated signal provided by the fan control module.

11. The system of claim 8 wherein a combination of the drive circuit and the fan control module is three phase commutation circuitry.

12. The system of claim 8 wherein the adjustment of the control signal in the drive circuit based on the back electromagnetic flux signal provides a low current usage of the three phase brushless direct current motor.

13. The system of claim 8 wherein the back electromagnetic flux signal indicates a performance of the three phase brushless direct current motor.

14. The system of claim 8 wherein the back electromagnetic flux signal is provided via a virtual ground of the three phase brushless direct current motor.

15. A method comprising:

receiving, at a drive circuit on a motherboard, a back electromagnetic flux signal from a three phase brushless direct current motor;

adjusting a pulse width modulated control signal based on the back electromagnetic flux signal indicating that a pole of the three phase brushless direct current motor is either lagging behind or jumping ahead of an uncharged coil of the three phase brushless direct current motor; and transmitting the adjusted pulse width modulated control signal to the three phase brushless direct current motor.

16. The method of claim 15 further comprising:

detecting a rotation of the three phase brushless direct current fan motor based on the back electromagnetic flux signal prior to adjusting the pulse width modulated control signal; and determining a timing of the three phase brushless direct current fan motor based on the back electromagnetic flux signal prior to adjusting the pulse width modulated control signal.

17. The method of claim 15 further comprising:

providing a low current usage of the three phase brushless direct current motor in response to the adjusting of the pulse width modulated control signal at the drive circuit based on the back electromagnetic flux signal.

18. The method of claim 15 wherein the back electromagnetic flux signal indicates a performance of the three phase brushless direct current motor.

19. The method of claim 15 wherein the back electromagnetic flux signal is provided via a virtual ground of the three phase brushless direct current motor.

20. The method of claim 15 wherein a supply voltage to the drive circuit is separate from the pulse width modulated signal provided by the fan control module.

* * * * *

UNITED STATES PATENT AND TRADEMARK OFFICE
CERTIFICATE OF CORRECTION

PATENT NO. : 8,242,727 B2  
APPLICATION NO. : 12/505222  
DATED : August 14, 2012  
INVENTOR(S) : Andrew T. Sultenfuss et al.

Page 1 of 1

It is certified that error appears in the above-identified patent and that said Letters Patent is hereby corrected as shown below:

Title page, Item [75], inventor name to read "Mark L. Rehmann"

Signed and Sealed this  
Twelfth Day of March, 2013

Teresa Stanek Rea  
*Acting Director of the United States Patent and Trademark Office*